(12) United States Patent
McDonald et al.

(10) Patent No.: US 9,167,381 B2
(45) Date of Patent: Oct. 20, 2015

(54) GEO-FENCE BASED ALERTS

(71) Applicant: MOTOROLA SOLUTIONS, INC., Schaumburg, IL (US)

(72) Inventors: Daniel J. McDonald, Cary, IL (US); George R. Economy, Arlington Hts, IL (US); Larry M. Peterson, West Chicago, IL (US); Mark Shahaf, Vernon Hills, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 50 days.

(21) Appl. No.: 14/133,782

(22) Filed: Dec. 19, 2013

(65) Prior Publication Data

US 2015/0181382 A1    Jun. 25, 2015

(51) Int. Cl.
*H04W 24/00* (2009.01)
*H04W 4/02* (2009.01)

(52) U.S. Cl.
CPC .................................... *H04W 4/021* (2013.01)

(58) Field of Classification Search
CPC ....... H04W 4/021; H04W 4/02; H04W 64/00; H04W 4/022; H04W 4/028; H04W 4/046; H04W 88/02; H04W 4/025; H04W 4/027; H04W 60/04; H04W 48/04; G01S 5/0027; G01S 19/42; G01S 17/42; G01S 19/40; G01S 5/00
See application file for complete search history.

(56) References Cited

U.S. PATENT DOCUMENTS

| | | | |
|---|---|---|---|
| 5,613,209 A | 3/1997 | Peterson | |
| 6,204,844 B1 | 3/2001 | Fumarolo | |
| 6,477,387 B1 | 11/2002 | Jackson | |
| 7,164,986 B2 * | 1/2007 | Humphries et al. | 701/517 |
| 7,493,211 B2 * | 2/2009 | Breen | 701/32.3 |
| 8,130,096 B2 | 3/2012 | Monte | |
| 8,229,473 B1 * | 7/2012 | De La Rue | 455/456.5 |
| 8,301,765 B2 | 10/2012 | Goodman | |
| 8,369,838 B2 * | 2/2013 | Mallavarapu et al. | 455/412.2 |
| 8,412,154 B1 | 4/2013 | Leemet et al. | |
| 8,930,132 B2 * | 1/2015 | Vellaikal et al. | 701/410 |
| 8,983,497 B2 * | 3/2015 | Ziskind et al. | 455/456.2 |
| 2005/0143096 A1 * | 6/2005 | Boesch | 455/456.3 |

(Continued)

FOREIGN PATENT DOCUMENTS

| | | |
|---|---|---|
| EP | 2583874 A2 | 4/2013 |
| WO | 8301765 A1 | 5/1983 |
| WO | 2008052188 A9 | 5/2008 |

OTHER PUBLICATIONS

PCT International Search Report Mailed Feb. 13, 2015 for Counterpart Application PCT/US2014/067252.

*Primary Examiner* — Ajit Patel

(74) *Attorney, Agent, or Firm* — Daniel R. Bestor

(57) ABSTRACT

Geo-fence based alerts are provided in a wireless communications network. A first subscriber device (SD) in the wireless communications network determines its current location. The first SD detects a geo-fence trigger by determining, as a function of the determined current location and a stored geo-fence database, that it has either (i) crossed a geo-fence boundary into a first active geo-fence in the stored geo-fence database or (ii) is within the first active geo-fence and has not yet begun playing back an alert associated with the first active geo-fence. Responsively, the first SD identifies an alert associated with the first active geo-fence and begins playback of the alert associated with the first active geo-fence.

17 Claims, 7 Drawing Sheets

(56) References Cited

U.S. PATENT DOCUMENTS

| | | |
|---|---|---|
| 2008/0125965 A1 | 5/2008 | Carani |
| 2009/0164118 A1 | 6/2009 | Breen |
| 2012/0323664 A1 | 12/2012 | Klems |
| 2013/0079028 A1 | 3/2013 | Klein |
| 2013/0091452 A1 | 4/2013 | Sorden |
| 2013/0106592 A1 | 5/2013 | Morgan |
| 2013/0143586 A1 | 6/2013 | Williams et al. |
| 2013/0324160 A1 | 12/2013 | Sabatellil |

* cited by examiner

GEO-FENCE BASED ALERTS

BACKGROUND OF THE INVENTION

A radio access network (RAN) provides for radio communication links to be arranged within the network between a plurality of user terminals. Such user terminals may be mobile and may be known as 'mobile stations' or 'subscriber devices.' At least one other terminal, e.g. used in conjunction with subscriber devices, may be a fixed terminal, e.g. a base station, eNodeB, repeater, and/or access point. Such a RAN typically includes a system infrastructure that generally includes a network of various fixed terminals, which are in direct radio communication with the subscriber devices. Each of the fixed terminals operating in the RAN may have one or more transceivers which may, for example, serve subscriber devices in a given region or area, known as a 'cell' or 'site', by radio frequency (RF) communication. The subscriber devices that are in direct communication with a particular fixed terminal are said to be served by the fixed terminal. In one example, all radio communications to and from each subscriber device within the RAN are made via respective serving fixed terminals. Sites of neighboring fixed terminals may be offset from one another and may provide corresponding non-overlapping or partially or fully overlapping RF coverage areas.

RANs may operate according to an industry standard protocol such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs including third generation and fourth generation networks such as third generation partnership project (3GPP) Long Term Evolution (LTE) networks.

RANs may additionally or alternatively operate according to an industry standard land mobile radio (LMR) protocol such as, for example, the Project 25 (P25) standard defined by the Association of Public Safety Communications Officials International (APCO), or other radio protocols, the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. Because these generally systems provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocols. Subscriber devices in RANs such as those set forth above send and receive data (such as encoded voice, audio, or audio/video streams) in accordance with the designated protocol.

OMA-PoC, in particular, enables familiar PTT and "instant on" features of traditional half duplex subscriber devices, but uses mobile subscriber devices operating over modern broadband telecommunications networks. Using PoC, wireless subscriber devices such as mobile telephones and notebook computers can function as PTT half-duplex subscriber devices for transmitting and receiving. Other types of PTT models and multimedia call models (MMCMs) are also available.

Floor control in an OMA-PoC session is generally maintained by a PTT server that controls communications between two or more wireless subscriber devices. When a user of one of the subscriber devices keys a PTT button, a request for permission to speak in the OMA-PoC session is transmitted from the user's subscriber device to the PTT server using, for example, a real-time transport protocol (RTP) message. If no other users are currently speaking in the PoC session, an acceptance message is transmitted back to the user's subscriber device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other subscriber devices in the group of subscriber devices or talk group to which the user is subscribed), using for example a unicast, point to multipoint, or broadcast communication technique.

Narrowband LMR systems, on the other hand, operate in either a conventional or trunked configuration. In either configuration, a plurality of subscriber devices is partitioned into separate groups of subscriber devices. In a conventional system, each subscriber device in a group is selected to a particular frequency for communications associated with that subscriber device's group. Thus, each group is served by one channel, and multiple groups may share the same single frequency (in which case, in some embodiments, group IDs may be present in the group data to distinguish between groups using the same shared frequency).

In contrast, a trunked radio system and its subscriber devices use a pool of traffic channels for virtually an unlimited number of groups of subscriber devices (e.g., talk groups). Thus, all groups are served by all channels. The trunked radio system works to take advantage of the probability that not all groups need a traffic channel for communication at the same time. When a member of a group requests a call on a control or rest channel on which all of the subscriber devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the subscriber devices were idling to a traffic channel for the call, and instruct all subscriber devices that are not participating in the new call to move to a newly assigned control or rest channel selected from the pool of available channels. With a given number of channels, a much greater number of groups can be accommodated in a trunked system as compared with conventional radio systems.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., subscriber devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, subscriber devices may dynamically affiliate with a group (and also disassociate with the group) perhaps based on user input, and the switching and/or radio network may track group membership and route new group calls according to the current group membership.

Many so-called "public safety" or other private or government wireless communication systems provide for group-based radio communications amongst a plurality of subscriber units. In certain situations, important alerts may need to be provided to the group or groups operating in a particular defined area. For example, at a mining site, events such as blasting operations impart unique alerting requirements on the wireless communication system and subscriber devices operating therein in preparation for, and perhaps during, a blasting operation. In other situations, a group or groups of subscriber devices may need to be alerted about events such as hazardous material leaks or weather alerts relative to a particular defined area. Other examples are possible as well.

Typical methods of signaling events such as blasting amongst subscriber units have historically relied upon an assignment of a separate RF channel over which predefined analog audio is mixed at the infrastructure and broadcast from the fixed terminal to the subscriber units, and played back at the subscriber units that are tuned to the separate RF channel, to indicate the respective event or hazard.

However, such typical methods provide a same alert (in this case, an alert tone) across a coverage area of an entire site, without an ability to selectively choose a particular alert based on the type of event or hazard, and/or to limit the alert to a particular area within a radio coverage cell of a base station broadcasting the alert. For example, a particular base station may provide wireless communications coverage over a 5 mile radius, but an alert may only be relevant to a one square mile area within the radio coverage cell. Furthermore, a relevant area may cross over two radio coverage cells of two adjacent base stations, in which case the alert may be broadcast over two large radio coverage cells when the alert is only relevant to a small sub-portion at the periphery of each radio coverage cell. Still further, common relevant areas may exist in multiple sub-portions of coverage areas, such as schools or parks. Other examples are possible as well.

Accordingly, what is needed is an improved method and apparatus for providing alerts, and more particularly, to providing geo-fence based alerts in a wireless communication system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
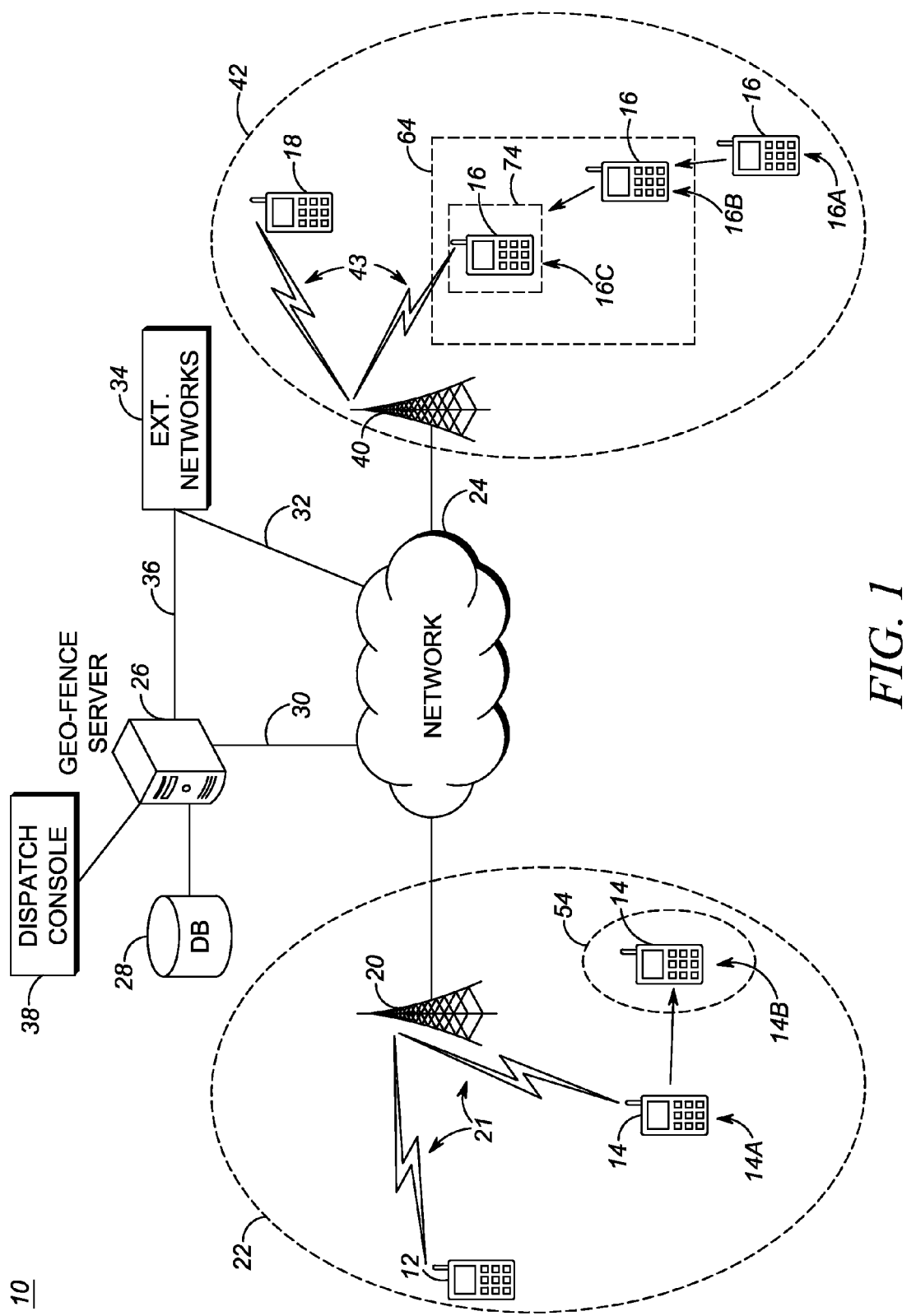
FIG. 1 is a block diagram of a wireless communications network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for providing alerts, and more particularly, to providing geo-fence based alerts in a wireless communication system.

In one embodiment, geo-fence based alerts are provided at subscriber devices (SDs) in a wireless communications network. A first subscriber device (SD) in the wireless communications network determines its current location. The first SD detects a geo-fence trigger by determining, as a function of the determined current location and a stored geo-fence database, that it has either (i) crossed a geo-fence boundary into a first active geo-fence in the stored geo-fence database or (ii) is within the first active geo-fence and has not yet begun playing back an alert associated with the first active geo-fence. Responsively, the SD identifies an alert associated with the first active geo-fence and begins playback of the alert associated with the first active geo-fence.

In another embodiment, geo-fence based alerts are provided at SDs in a wireless communications network under control of a geo-fence server. The geo-fence server maintains a database of geo-fences within a radio coverage cell of each of one or more base stations associated with each radio coverage cell, the database including a mapping that identifies, for each active geo-fence in the database, a corresponding alert for playback by a SD when the SD enters the active geo-fence. The geo-fence server periodically or intermittently broadcasts, for at least each active geo-fence in the database, a mapping identifying a corresponding alert for play back by a SD when the SD enters the active geo-fence.

Each of the above-mentioned embodiments will be discussed in more detail below, starting with example network and device architectures of the system in which the embodiments may be practiced, followed by a discussion of processes for providing geo-fence based alerts from subscriber device and geo-fence server perspectives. Further advantages and features consistent with this disclosure will be set forth in the following detailed description, with reference to the figures.

1. Network Architecture and Device Structure

FIG. 1 illustrates a communications network 10 including client subscriber devices (e.g., SDs) 12, 14, 16, 18, fixed terminals 20, 40 (e.g. base stations), wireless links 21, 43, backhaul network 24, geo-fence server 26, database 28, communications connections 30, 32, 36, dispatch console 38, and external networks 34. Each base station 20, 40 has at least one radio transmitter covering a radio coverage cell (22, 42). One or several SDs 12, 14, 16, 18 within radio coverage cells 22, 42 of the respective base stations 20, 40 may connect to the base stations 20, 40 using a wireless communication protocol via respective wireless links 21, 43. The SDs 12, 14, 16, 18 may communicate with each other, and perhaps other devices accessible via other network links, using a group communications protocol over wireless links 21, 43. Wireless links 21, 43 may be, for example, a wireless link supporting a protocol such as GPRS or UMTS, 2G, (e.g. GSM), 3G (e.g. WCDMA or LTE), iDEN, wireless LAN (WLAN), or ETSI Digital Mobile Radio (DMR), among other possibilities. The SDs 12, 14, 16, 18 may be configured with an identification reference (such as an IMSI, International Mobile Subscriber Identity, or an SUID, Subscriber Unit Identifier) which may be connected to a physical media (such as a SIM card, Subscriber Identity Module).

Each SD 12, 14, 16, 18 may be a group communications device, such as a push-to-talk (PTT) device, that is normally maintained in a monitor only mode, and which switches to a transmit-only mode (half-duplex) or transmit and receive mode (full-duplex) upon depression or activation of a PTT input switch. The group communications architecture in communications network 10 allows a single SD, such as SD 14, to communicate with one or more members (such as SDs 12, 16-18) associated with a particular group of SDs at the same time. SDs 12, 14, 16, 18, base stations 20, 40, and/or an infrastructure controller (not shown) may cooperate to define groups of SDs and enable the one-to-many communications feature provided by communications network 10. As SDs are mobile, they may move within, into, out of, and/or between radio coverage cells 22, 42. For example, SD 14 may move from an initial location 14A within radio coverage cell 22 to a subsequent location 14B also within radio coverage cell 22. Similarly, SD 16 may move from an initial location 16A outside of radio coverage cell 42 to a secondary location 16B within radio coverage cell 42, and then to a final location 16C also within radio coverage cell 42.

Although only four SDs and two base stations are illustrated in FIG. 1, the present disclosure is not limited as such, and more or fewer SDs and more or fewer base stations could be used in any particular implementation. Furthermore, while a single geo-fence server 26 is illustrated in FIG. 1, more than one geo-fence server 26 may be used and/or a distributed geo-fence server 26 may be used that divides functions across multiple devices, perhaps for load balancing reasons. Finally, while database 28 is illustrated as directly coupled to geo-fence server 26, database 28 may also be remote from geo-fence server 26 and accessible to geo-fence server 26 via one or more of network 24 and/or external networks 34.

The base stations 20, 40 may be linked to the geo-fence server 26 via network 24 and communications connection 30. Network 24 may comprise one or more routers, switches, LANs, WLANs, WANs, access points, or other network infrastructure. For example, geo-fence server 26 may be accessible to base stations 20, 40 via a dedicated wireline or via the Internet. In one example, base stations 20, 40 may be directly coupled to geo-fence server 26 via one or more internal links under control of a single communications network provider.

Geo-fence server 26 may be a separate device configured to maintain a database of geo-fences within one or more radio coverage cells of one or more base stations with which it is associated, and may provide mechanisms and/or interfaces for activating or de-activating existing geo-fences it is maintaining, for adding new geo-fence definitions, and for deleting existing geo-fence definitions. The geo-fence server 26 may further maintain mappings that identify, for each active geo-fence in the database, a corresponding assigned alert for playback by a SD when the SD enters or otherwise finds itself within the geo-fence. The geo-fence server 26 may further provide mechanisms and/or interfaces for modifying an assigned alert in the mapping, for adding a new mapping that assigns an existing geo-fence definition to an associated alert, and for removing an existing mapping. In other embodiments, geo-fence server 26 may be embodied within or coupled to another network device, such as a base station controller (BSC), mobile switching center (MSC), site controller, zone controller, Push-to-Talk controller, or other network device, inside network 24 or outside of network 24.

Database 28 may function to store geo-fence definitions and mappings and provide them, upon request, to geo-fence server 26. For example, database 28 may store a first geo-fence definition defining a first geo-fence 54 within radio coverage cell 22 and associated with base station 20, a second geo-fence definition defining a second geo-fence 64 that is partially within radio coverage cell 42 and associated with base station 42 (and perhaps another, adjacent base station, not shown), and a third geo-fence definition defining a third geo-fence 74 that is within (e.g., a sub-region of) geo-fence 64 and radio coverage cell 42 and is also associated with base station 40. Geo-fence definitions may take the form of a set of three or more polygon vertices, where each polygon vertex is a GPS coordinate, such as a latitude and longitude pair, or some other form of cartographic definition. Additionally or alternatively, geo-fence definitions may take the form of a point and radius, where the radius is a distance criterion and the point is a GPS coordinate, such as a latitude and longitude pair, or some other form of cartographic definition. Further, geo-fence definitions may take the form of a set of two diagonally opposing rectangular vertices, where each rectangular vertex is a GPS coordinate, such as a latitude and longitude pair, or some other form of cartographic definition. Other possibilities exist as well.

The term 'talk group' is used in this specification to refer to a group of SD's. The term is not intended to be limited to voice communications, but rather, to embody all possible group communications payloads, including but not limited to, voice, data, video, audio, audio/video, images, and/or any other type of media stream.

Furthermore, while the terms "group call" and "talk group" are used throughout the specification to refer to group call examples in a one-to-many group communication structure, in each example, the same or similar considerations can be applied to "group sessions" and "sessiongroups," respectively, when exchanging multimedia messages between group members. Such multimedia messages may include, but not be limited to, video, audio, audio/video, images, and any other type of media stream. Furthermore, the one-to-many group communication structure may utilize any one or more messaging protocols, including unicast, multicast, broadcast, or any combination thereof.

External networks 34 may also be accessible to base stations 20, 40 (and thus SDs 12, 14, 16, 18) via network 24 and communications connection 32 and/or geo-fence server 26 and communications connections 30, 36. External networks 34 may include, for example, a public switched telephone network (PSTN), the Internet, or another wireless service provider's network, among other possibilities.

Communications system 10 may implement, in one embodiment, a narrow-band trunked radio communication system in which SDs 12, 14, 16, 18 transmit control and data messages in accordance with an air interface protocol such as that defined by the ETSI Digital Mobile Radio (DMR), Terrestrial Trunked Radio (TETRA), or Association of Public- Safety Communications Officials 25 (APCO P25) standards. In a trunked radio communication system, frequencies are assigned for talk group use on an as-needed basis, and signaling over a control channel is used to direct SDs to a particular channel to receive a particular group communication. In another embodiment, communications system 10 may implement a PTT over Cellular (OMA-PoC) or PTT over IP (PoIP) broadband architecture in which SDs 12, 14, 16, 18 transmit control and data messages in accordance with a protocol such as real-time transport protocol (RTP) and/or session initiation protocol (SIP). Other possibilities exist as well.

Dispatch console 38 may be directly coupled to geo-fence server 26 as shown, or may be indirectly coupled to geo-fence server 26 via one or more of network 24 and external networks 34. The dispatch console 38 may provide an administrative or dispatch access to SDs 12, 14, 16, 18 and geo-fence server 26, and allow an administrator or dispatcher to initiate infrastructure-sourced group communications to groups of SDs 12, 14, 16, 18, among other features and functions.

Figure 2:
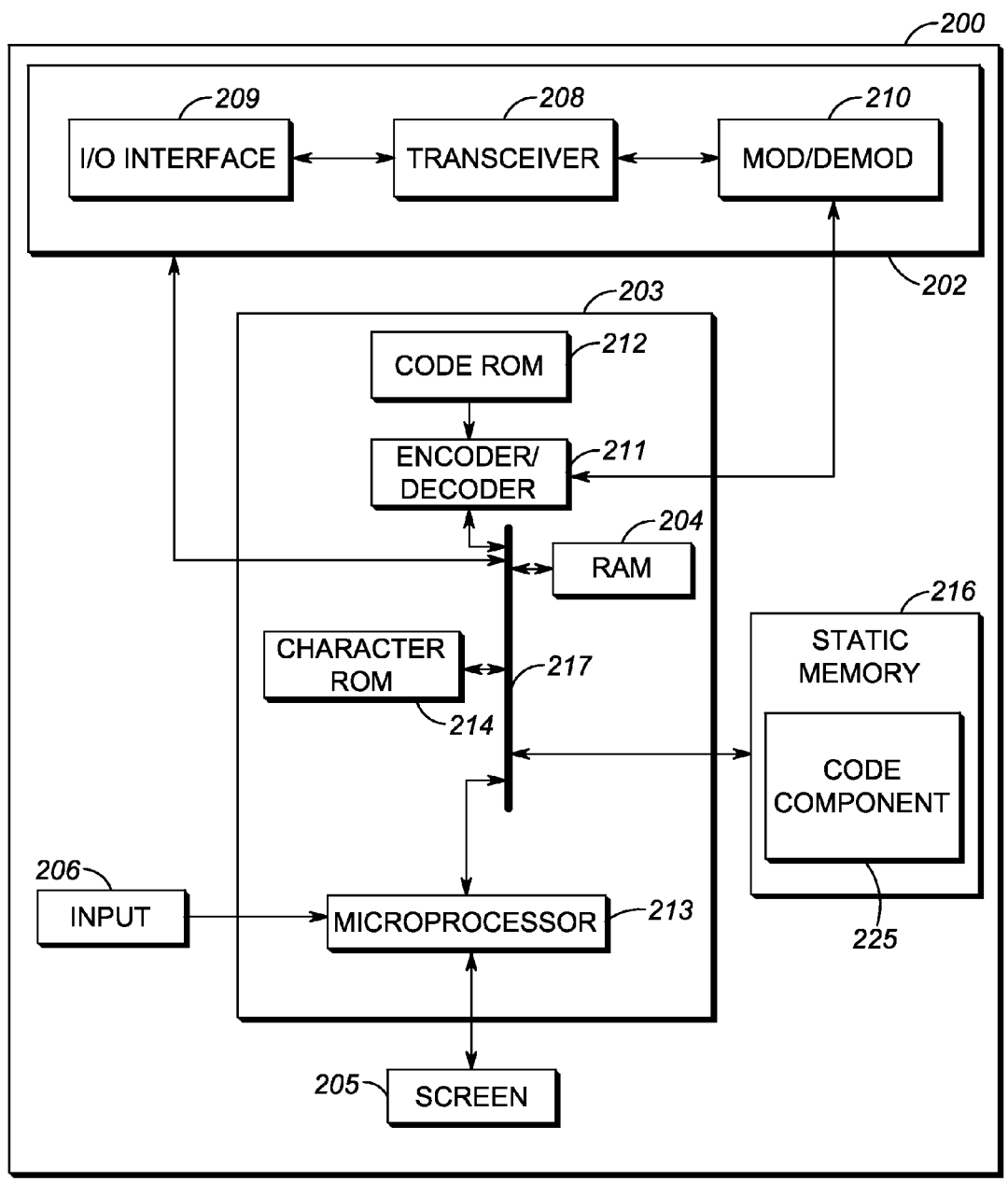
FIG. 2 is a block diagram of a geo-fence server in accordance with some embodiments.

Referring to FIG. 2, a schematic diagram illustrates a geo-fence server 200 according to some embodiments of the present disclosure. Geo-fence server 200 may be, for example, the same as or similar to the geo-fence server 26 of FIG. 1. As shown in FIG. 2, geo-fence server 200 includes a communications unit 202 coupled to a common data and address bus 217 of a processing unit 203. The geo-fence server 200 may also include an input unit (e.g., keypad, pointing device, etc.) 206 and a display screen 205, each coupled to be in communication with the processing unit 203.

The processing unit 203 may include an encoder/decoder 211 with an associated code Read Only Memory (ROM) 212 for storing data for encoding and decoding voice, data, control, or other signals transmitted or received by geo-fence server 200. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include one or more wired or wireless input/output (I/O) interfaces 209 that are configurable to communicate with BSs such as BSs 20, 40 of FIG. 1, with other devices in the communications network 10, and/or with the dispatch console 38. The communications unit 202 may include one or more wireless transceivers 208, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The communications unit 202 may alternatively or additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding or encoding data such as control channel messages and/or data or voice messages that may be transmitted or received by the geo-fence server 200. Static memory 216 may store operating code 225 for the microprocessor 213 that, when executed, performs one or more of the steps described with respect to FIG. 6 and corresponding text. Static memory 216 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

Figure 3:
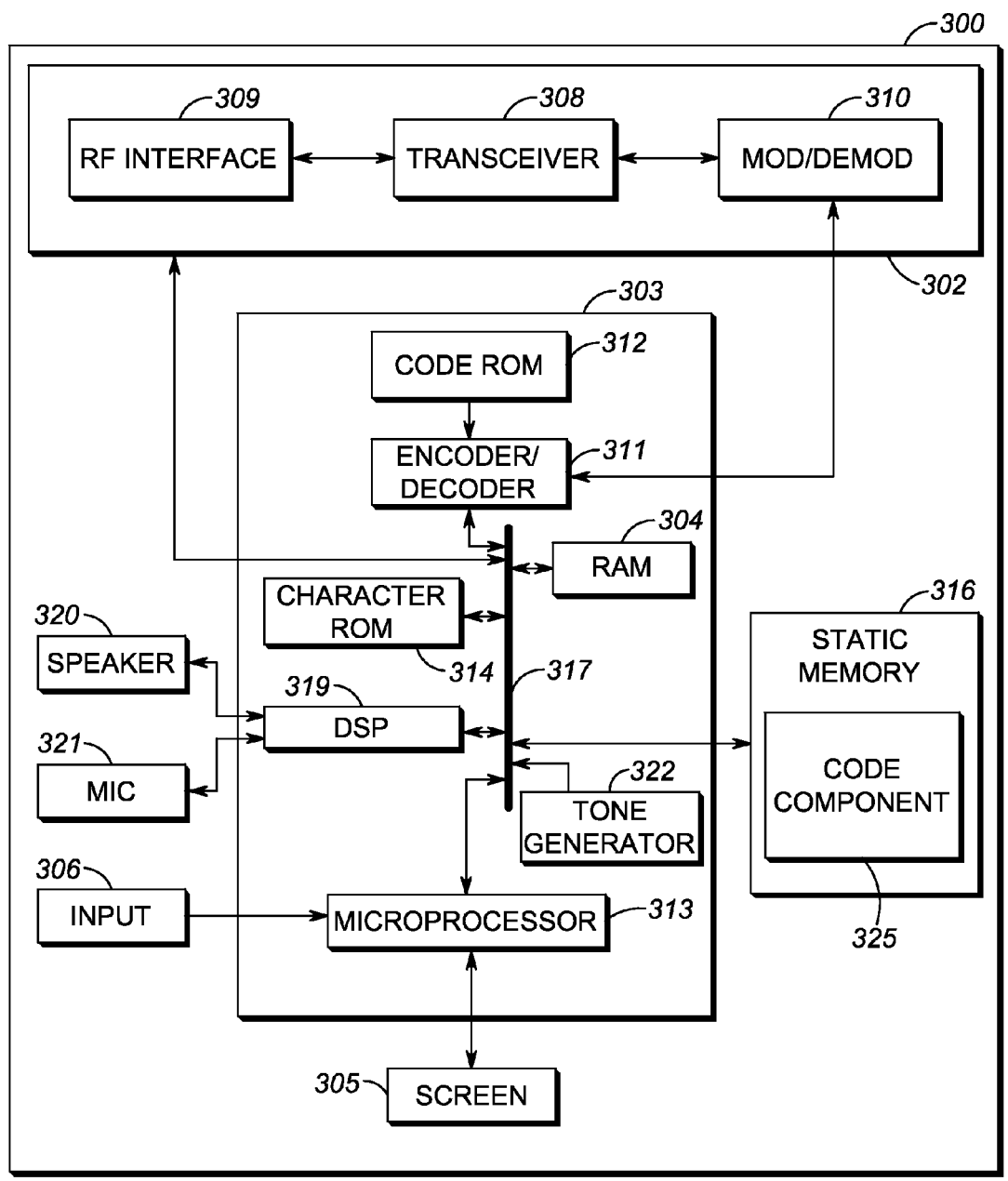
FIG. 3 is a block diagram of a subscriber device in accordance with some embodiments.

FIG. 3 is an example functional block diagram of a SD 300, which may be the same or similar as SD 14, operating within the communications system 10 of FIG. 1 in accordance with some embodiments. Other SDs such as SDs 12, 16, and 18 may contain same or similar structures. As shown in FIG. 3, SD 300 includes a communications unit 302 coupled to a common data and address bus 317 of a processing unit 303. The SD 300 may also include an input unit (e.g., keypad, pointing device, etc.) 306, an output transducer unit (e.g., speaker) 320, an input transducer unit (e.g., microphone) 321 and a display screen 305, each coupled to be in communication with the processing unit 303.

The processing unit 303 may include an encoder/decoder 311 with an associated code Read Only Memory (ROM) 312 for storing data for encoding and decoding voice, data, control, or other signals that may be transmitted or received by SD 300. The processing unit 303 may further include a microprocessor 313 coupled, by the common data and address bus 317, to the encoder/decoder 311, a character ROM 314, a RAM 304, and a static memory 316. The processing unit may also include a digital signal processor (DSP) 319, coupled to the speaker 320 and the common data and address bus 317, for operating on audio signals received from one or more of the communications unit 302, the static memory 316, and a tone generator unit 322 for generating audio tones, and providing a resultant audio signal to the output transducer 320.

The communications unit 302 may include an RF interface 309 configurable to communicate with other SDs within its communication range and with BSs within its communication range such as BSs 20, 40 of FIG. 1. The communications unit 302 may include one or more wireless transceivers 308, such as an APCO P25 transceiver, a DMR transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE transceiver, and/or other similar type of wireless transceiver configurable to communicate via a wireless network. The transceiver 308 is also coupled to a combined modulator/demodulator 310 that is coupled to the encoder/decoder 311. The character ROM 314 stores code for decoding or encoding data such as control channel messages, alert mapping updates, and/or data or voice messages that may be transmitted or received by the SD 300.

Figure 4A:
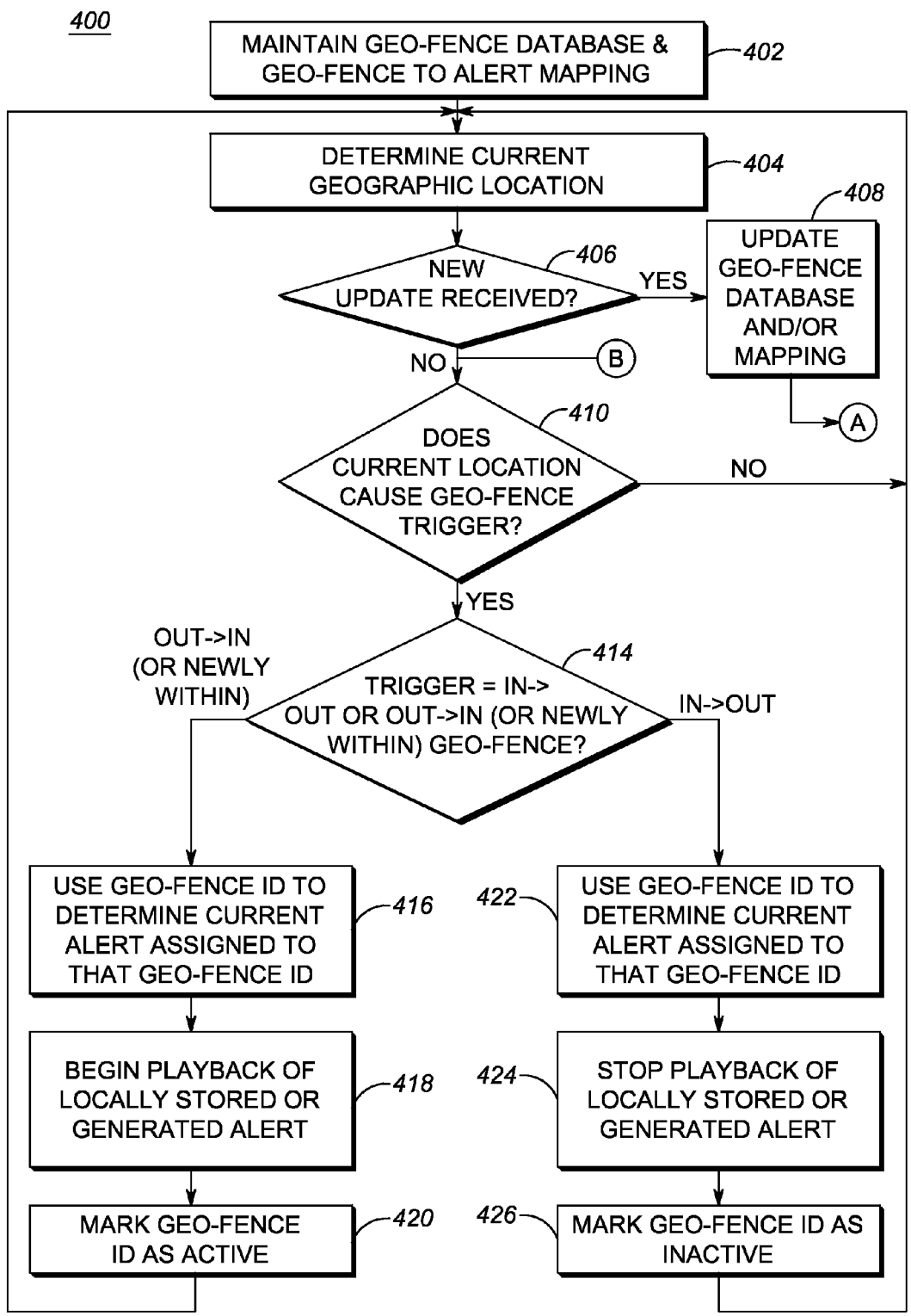
FIGS. 4A-4B include a flow diagram illustrating a process that may be implemented at a subscriber device of FIG. 3 in accordance with an embodiment.
Figure 4B:
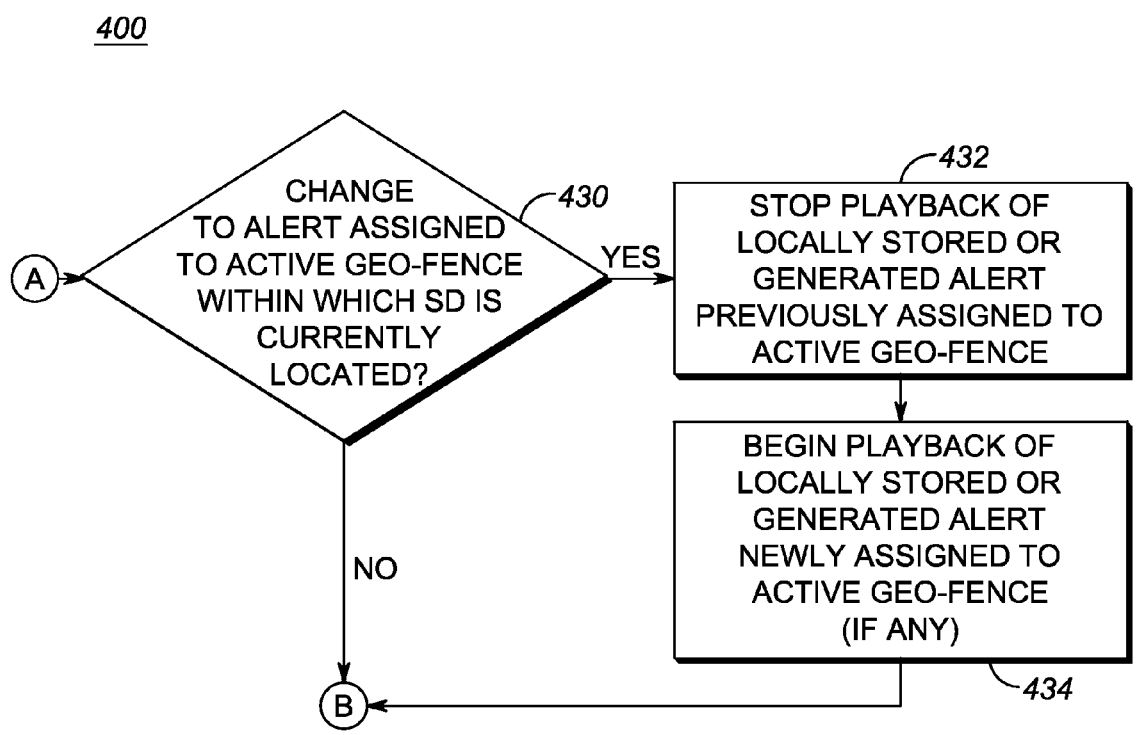

Static memory 316 may store operating code 325 for the microprocessor 313 that, when executed, performs one or more of the steps set forth in FIGS. 4A-4B and corresponding text. Static memory 316 may comprise, for example, a HDD, an optical disk drives such as a CD drive or DVD drive, a SSD, a tape drive, a flash memory drive, or a tape drive, to name a few.

2. Processes for Providing Geo-fence Based Alerts

FIGS. 4A-4B set forth a flow chart illustrating a process 400 that may be implemented at a subscriber device such as the SD 14 of FIG. 1 and/or SD 300 of FIG. 3 to provide geo-fence based alerts consistent with the present disclosure. Of course, additional steps not disclosed herein could be additionally added before, after, or in-between steps disclosed in FIGS. 4A-4B, and the presence of such additional steps would not negate the purpose and advantages of the examples set forth in detail throughout the remainder of this disclosure.

At step 402, the SD maintains a database of geo-fence definitions and geo-fence definition to alert mappings that, for those geo-fence definitions that are active, designate an assigned alert for playback when the SD determines that it has entered or otherwise determined that it is within the defined boundaries of a particular geo-fence defined by the geo-fence definitions. The geo-fence definitions stored at each SD may be provisioned and/or pre-configured at each SD by a manufacturer or system administrator, may be provided to each SD over-the-air by a serving BS, may be manually entered or updated via a user interface (for example, input unit 306 and display screen 305 of SD 300 of FIG. 3), or may be populated via a combination of any of the foregoing. Geo-fence definitions entered at a SD via its user interface may be subsequently provided to the geo-fence server via its serving BS for storage at the geo-fence server and further distribution to other SDs. Geo-fence definitions may take a form that is the same or similar to that set forth above with respect to geo-fence definitions stored at geo-fence server 26 and/or database 28 of FIG. 1. Alert mappings may be provided separately from the geo-fence definitions or integrated with the geo-fence definitions themselves. Similar to the geo-fence definitions, the alert mappings stored at each SD may be pre-configured at each SD by a manufacturer or system administrator, may be provided to each SD over-the-air by a serving BS, may be manually entered or updated via a user interface, or may be populated via a combination of any of the foregoing.

For example, geo-fence definitions may be set forth in a geo-fence look-up table similar to the look-up table set forth in Table I below.

TABLE I

Example Geo-fence Definition Look-up Table

| Geo-fence ID | Type | Definition | Associated Base Station ID(s) |
|---|---|---|---|
| 0 | Point + Radius | Point: +42.07,−88.05 Radius: 1 km | $AEF1_{16}$ |
| 1 | Rectangular | Vertex 1: +42.5, −88.5 Vertex 2: +42, −87.7 | $AEF1_{16}$ |
| 2 | Polygon | Vertex 1: +42.5, −88.5 Vertex 2: +42.5, −87.7 Vertex 3: +42, −87.7 | $AEF1_{16}$, $BC32_{16}$ |

As illustrated in Table I, a geo-fence definition database may include a look-up table defining three geo-fences of a particular differing type and having geo-fence ID's of 0-2. While Table I illustrates three geo-fence definitions using three different types of geo-fence definitions for exemplary purposes only, in other embodiments, a single type of geo-fence definition could be used consistently throughout the database, and more or less than three geo-fence definitions may be set forth. In Table 1, geo-fence ID 0 is illustrated as a point+ radius type geo-fence definition having a central point at latitude/longitude +42.07,−88.05 and covering a radius extending from that central point by a distance of 1 km. Geo-fence ID 1 is illustrated as a rectangular type geo-fence definition having two defined diagonal opposing vertices at latitude/longitude +42.5,−88.5 and +42,−87.7. Geo-fence ID 2 is illustrated as a polygon type geo-fence definition having three defined vertices (e.g., a triangle in this case) at latitude/longitude +42.5,−88.5, +42.5,−87.7, and +42,−87.7. In some embodiments, an indication may also be included of which base station's radio coverage cells the geo-fence is fully or partially located in. In Table I, for example, geo-fence IDs 0 and 1 are located in a same radio coverage cell associated with BS ID $AEF1_{16}$, while geo-fence ID 2 is located across two radio coverage cells associated with BS IDs $AEF1_{16}$ and $BC32_{16}$. Base station associations can be used by geo-fence servers to determine which BSs to broadcast updates or additions to geo-fence definitions or alert mappings over, so that updates are only broadcast in those radio coverage cells covering geo-fences that are affected by the change or addition, among other possibilities. For example, the geo-fence server may maintain a mapping between geo-fence definitions and associated base stations, perhaps determined by empirically comparing geo-fence definitions with known radio coverage cells corresponding to respective base stations, or by provisioning or pre-configuration, among other possibilities. Base station associations could also be used by SDs to limit the number of geo-fence boundaries it checks its current location against based on the BS with which it is currently attached, among other possibilities. Other ways of storing geo-fence definitions could be used in addition to or in place of the example look-up table set forth in Table 1 above.

Similar to the geo-fence definitions, alert mappings stored at each SD may be set forth in an alert-tone mapping look-up table such as that set forth in Table II below.

TABLE II

Example Alert Mapping Look-up Table

| Geo-fence ID | Alert ID |
|---|---|
| 0 | 1 |
| 1 | 3 |
| 2 | <Null> |

As illustrated in Table II, each of the geo-fences defined in the geo-fence definition database are included in the alert mapping. In this example, geo-fence ID 0 is currently mapped to alert ID 1, while geo-fence ID 1 is currently mapped to alert ID 3. Geo-fence ID 2, meanwhile, is currently mapped to a <Null> value, meaning the alert for that geo-fence definition is not currently active. In other embodiments, the geo-fence ID (2 in this example) may simply be removed from the mapping when the alert is disabled for that geo-fence ID. Other possibilities exist as well.

In some embodiments, each alert ID may be hard-coded at each SD to correspond to a particular type of tone (generated or stored). In other embodiments, and in addition to the geo-fence definition database and alert mappings, each SD may further include an alert ID look up table that may be updateable or modifiable to change an association between an alert ID and a particular alert for playback. For example, the alert ID in the alert mapping may provide an index into an alert ID look-up table such as that set forth in Table III below.

TABLE III

Example Alert ID Look-up Table

| Alert ID | Function | Source | Source Parameters |
|---|---|---|---|
| 0 | Approach Warning Tone | Tone Generator | Freq.: 400 Hz; Duration: 2 s; Rep. Rate: 500 s |
| 1 | Entrance Warning Tone | Tone Generator | Freq.: 500 Hz; Duration: 5 s; Rep. Rate: 300 s |

TABLE III-continued

Example Alert ID Look-up Table

| Alert ID | Function | Source | Source Parameters |
|---|---|---|---|
| 2 | Emergency Tone | Tone Generator | Freq.: 1,000 Hz; Duration: 10 s; Rep. Rate: 100 s |
| 3 | Weather Alert | Stored Audio File | "Filename.ogg" |
| 4 | Tsunami Watch Alert | Stored Text File | "TsunamiWatch.txt" |

In Table III, for example, an alert ID of "0" may indicate an approach warning tone function (e.g., that the user is approaching a restricted area) that should be sourced from a local tone generator at each SD using the parameters associated with that alert ID (parameters that may be stored at each SD), which may include one or more of frequency of the tone, duration of the tone (on duration, perhaps including a predefined value implying a continuous on duration), and repetition rate of the tone (time between adjacent on periods, which may be 0 for a continuous tone). An alert ID of "1" may indicate an entrance warning tone function (e.g., that the user has entered a restricted area) that should be sourced from a local tone generator at each SD using the parameters associated with that alert ID, which in this case uses a higher frequency, longer duration, and quicker repetition rate than the approach warning tone (alert ID 0). An alert ID of "2" may indicate an emergency function that is also sourced from a local tone generator, but perhaps using different parameters to distinguish it from the approach and warning alert tones to more quickly and forcefully alert the user to an imminent danger.

An alert ID of "3" may indicate a weather alert tone sourced from a locally stored spoken audio file stored at each SD (e.g., perhaps indicating a tornado watch or warning and indicating what actions should be taken), and the parameters column may specify the file name and/or path to retrieve the stored digital audio file for play back. Parameters for the stored audio file may also include a duration value and a repetition rate value defining when and for how long to play back the stored audio file, similar to the tone generator parameters. In another embodiment, no parameters may be included in the look-up table for stored audio files and instead, the stored audio file itself may be played back in a looped fashion and may itself include the repetition rate and duration within the stored digital audio recording.

An alert ID of "4" may indicate a tsunami watch alert sourced from a locally stored text file stored at each SD, and the parameters column may specify the file name and/or path to retrieve the stored text file for play back. For example, the text file may include the characters "Tsunami Alert Has Been Issued, Take Cover!" Parameters for the stored text file may also include text display parameters such as font size, font style, and a duration value and a repetition rate value defining when and for how long to play back (e.g., display) the stored text. In another embodiment, a stored image file may be referenced instead, and parameters may be included in the look-up table that specify a display resolution for the image, and a duration value and a repetition rate value defining when and for how long to play back (e.g., display) the stored image.

Other types of alerts could be implemented as well, such as tactile alerts that cause some tactile response in the SD. Particular designated warning LEDs could be lit or unlit on demand as well. Other variations are also possible.

Table III sets forth just one example of an index structure that may be used at SDs for indexing alerts. Of course, other types of indexing methods could also be used and other methods of identifying a particular tone or stored audio file for play back could also be used. Furthermore, other types of warnings, including warning relating to other types of weather conditions, warning relating to mining operations, warnings relating to commercial or industrial incidents or accidents, public safety incident scenes, or other types of warnings, conditions, or events could be included as well.

At step 404, the SD determines its current geographic location. For example, the SD may calculate its geographic location using a satellite-based triangulation process (perhaps via a GPS receiver or application, or similar satellite-based system such as GLONASS, GNSS, or Compass) or via a terrestrial-based triangulation process.

At step 406, the SD determines whether an update was received over-the-air from its serving BS, the update including a new geo-fence definition and/or alert mapping, or a geo-fence definition or alert mapping modification (including removal thereof). If an update has been received, processing proceeds to step 408, where the geo-fence database and/or alert mapping is updated in the geo-fence database accordingly.

Figure 5:
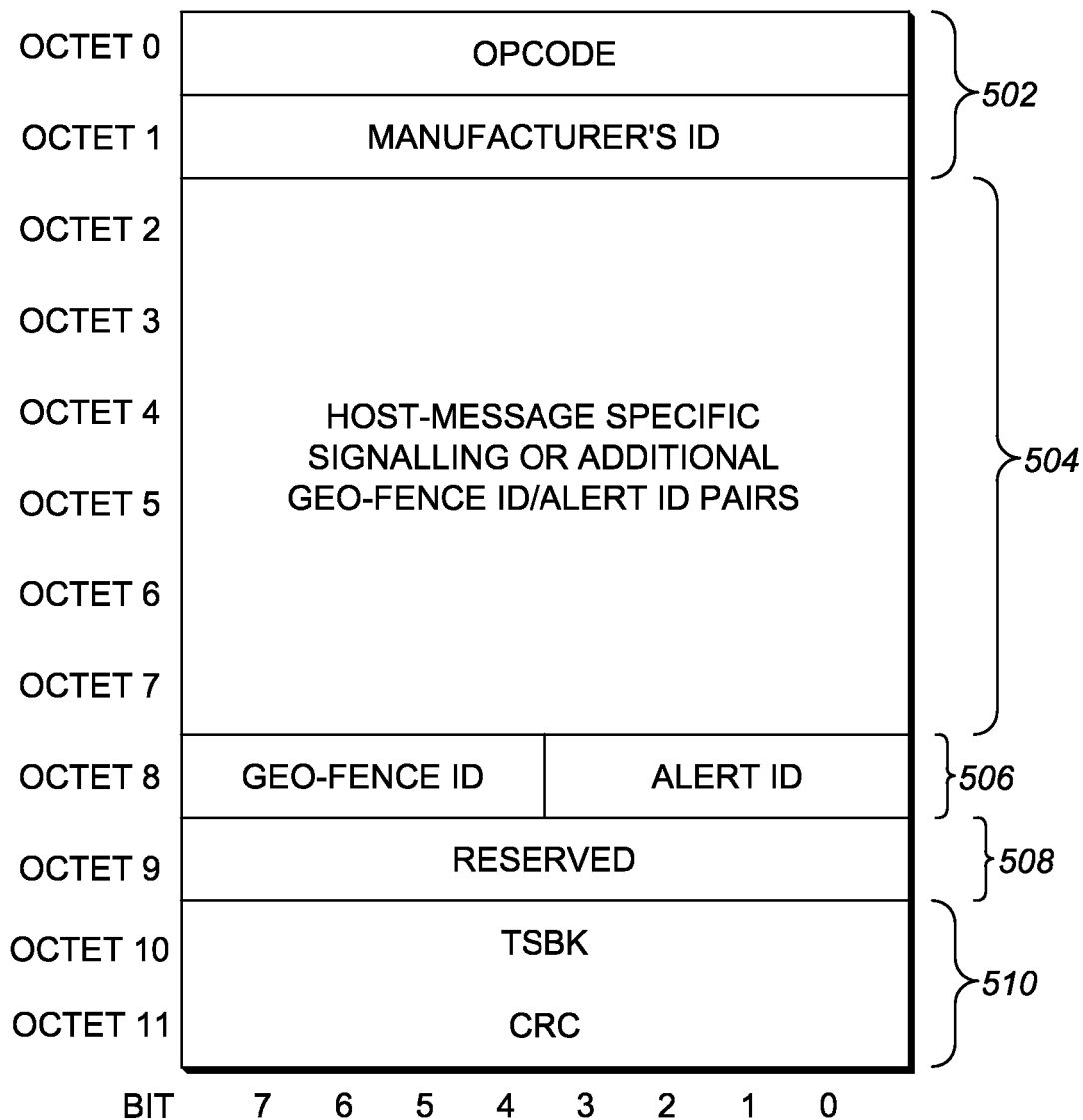
FIG. 5 is a block diagram illustrating an example outbound signaling packet that may be transmitted by base stations to update subscriber devices with new geo-fence alert information in accordance with an embodiment.

FIG. 5 sets forth an example message structure 500 that may be used in a Geofence_Update_Bcst message. In this example, the message structure 500 is a MOT_GEO_BCST proprietary outbound signaling packet (OSP) that periodically transmits proprietary site and/or system information consistent with a Motorola Solutions feature set. Of course, similar outgoing packets could be formatted in accordance with different protocols implemented in a wireless communications system.

The first and second octets 502 include an opcode field and manufacturer's ID field that are set consistent with the Motorola Solutions feature set. The third through eighth octets 504 contain propriety signaling consistent with the Motorola Solutions feature set. The ninth octet 506 includes a geo-fence ID field and an alert ID field. In other embodiments, the third through eighth octets 504 may each contain a geo-fence ID field and alert ID field similar to the ninth octet 506 such that a single MOT_GEO_BCST OSP 500 could be used to identify a plurality of geo-fence ID to alert ID mappings.

The geo-fence ID field identifies a particular geo-fence ID whose alert ID mapping is being updated, added, de-activated, or removed. For example, a value of 0 in the geo-fence ID field could identify the first geo-fence in Table I above having a definition of "Point: +42.07,−88.05, Radius: 1 km" and associated with BS ID $AEF1_{16}$.

The alert ID field identifies the alert to be added, updated, or removed relative to the geo-fence ID also identified in the ninth octet 506. For example, a value of <Null> included in the alert ID field would de-activate the alert for geo-fence ID 0, which previously referred to an entrance warning tone as set forth in Table III above.

In another example, a geo-fence ID value of 2 and an alert ID # of 3 could newly add an alert and activate geo-fence 2 to play back a Weather Alert when SDs enter or otherwise find themselves within geo-fence 2, in accordance with Tables I-III above.

The tenth octet 508 includes an additional Reserved field. The eleventh-twelfth octets 510 may include a CRC value for use in verifying that the message has been received at a receiving device in an error-free state.

Messages similar to message structure 500 may be used for other purposes as well, such as modifying a function, source, or source parameters of an alert ID, adding a new alert ID, or removing an alert ID in an alert ID look-up table such as set forth in Table III. Further, messages similar to message structure 500 may be used to modify a geo-fence definition, add a new geo-fence definition, or remove a geo-fence definition in a geo-fence look-up table such as set forth in Table I.

Returning to FIGS. 4A-4B, SDs receiving the message structure 500 would parse the message and update their alert mapping (and/or their geo-fence definitions or alert IDs, as the case may be) in their local geo-fence database corresponding to the message contents. In accordance with the remaining steps 410-420, the addition of a new geo-fence and corresponding alert mapping or the addition of a new alert mapping to an existing geo-fence would be detected and the corresponding alert played back if the SD finds that it is within the defined geo-fence, as set forth below. In the event that a currently active geo-fence within which the SD is located is either updated or removed (e.g., updated to refer to a different alert ID or de-activated such as set to <Null>), processing proceeds from step 408 of FIG. 4A to step 430 of FIG. 4B, in which the SD determines if a change to an alert mapping for a currently active geo-fence within which the SD is currently located was received at step 408. The SD may mark and un-mark geo-fences as active when it starts and stops playing back an alert, so as to aid it in more quickly determining whether a particular geo-fence alert is already active and being played back, as discussed with respect to steps 420 and 426 below, or may use some other mechanism to determine whether a particular geo-fence alert is already being played back when an update to it is received.

If it is determined at step 430 that no such change was received, processing proceeds to step 410 of FIG. 4A. If, however, such a change was determined to have been received at step 430, at step 432, the SD stops playback of the locally stored or generated alert that was previously assigned to the currently active geo-fence within which the SD is located, and at step 434, begins playback of the locally stored or generated alert newly assigned to the currently active geo-fence within which the SD is located (if any). For example, if the alert mapping for geo-fence 0 is updated from alert ID 1 in Table II to <Null> via an over-the-air message such as message structure 500, while the SD is currently located within geo-fence 0, the alert associated with alert ID 1 is halted at the SD at step 432, and at step 434, no new alert is played back at step 434. If, instead, the alert mapping for geo-fence 0 was updated from alert ID 1 in Table II to alert ID 2, while the SD is currently located within geo-fence 0, the alert associated with alert ID 1 is halted at the SD at step 432, and at step 434, the alert associated with alert ID 2 is started to be played back in accordance with the stored alert ID 2's parameters as set forth in Table III. After step 434, processing proceeds back to step 410 of FIG. 4A. While geo-fence database and mapping update steps 408 and 430-434 are illustrated in FIGS. 4A-4B as occurring sequentially with geo-fence trigger steps 410-426 for ease of illustration, in other embodiments, steps 408 and 430-434 may occur simultaneously or at least partially overlapping with steps 410-426.

At step 410 of FIG. 4A, the SD determines if the SD's current location determined at step 406 generates a geo-fence trigger. In some embodiments, step 410 could be executed prior to step 406, or instead of step 406. A geo-fence trigger could be generated for a number of different reasons. For example, an out to in (out->in) geo-fence trigger could be generated when the SD determines that it has moved from outside of a geo-fence border (as defined in the geo-fence database) to within the geo-fence border. This determination may be made by comparing the current geographic location of the SD from step 404 to each of the geo-fence definitions stored at the SD, and determining if a boundary has been crossed.

Some hysteresis may be provided in this decision in order to prevent the constant generation of geo-fence triggers (e.g., a time-based hysteresis restriction preventing another geo-fence trigger for the same geo-fence for a pre-defined number of seconds, such as 1-60 s, after the first geo-fence trigger is raised, or a distance-based hysteresis restriction preventing a geo-fence trigger for a geo-fence from being raised until the SD is detected to have moved a pre-defined distance, such as 10-100 meters, past a geo-fence border and into the defined geo-fence). Further, an in to out (in->out) geo-fence trigger could be generated when the SD determines that it has moved from inside of a geo-fence border to outside of the geo-fence border, with or without a similar time or distance-based hysteresis applied.

Additionally or alternatively, a geo-fence trigger may be raised when the SD finds itself "newly within" a geo-fence that has not been previously raised or detected at the SD, perhaps due to the SD powering up within a defined active geo-fence in the geo-fence database, or a new geo-fence definition and/or alert mapping was added to the geo-fence database via step 408. Similar to the above, this determination may be made by comparing the current geographic location of the SD from step 404 to each of the geo-fence definitions stored at the SD, and determining if the SD is newly within one of the geo-fence definitions.

If no geo-fence trigger is detected at step 410, processing proceeds back to step 406. If, however, a geo-fence trigger is detected at step 410, processing proceeds to step 414.

At step 414, the SD determines what type of geo-fence trigger was raised at step 410. If an out->in geo-fence trigger or a newly within trigger was detected at step 410, processing proceeds to step 416. If, on the other hand, an in->out geo-fence trigger was raised at step 410, processing proceeds to step 422.

At step 416, the SD determines the geo-fence ID of the geo-fence it has newly entered (or of the geo-fence it otherwise finds itself newly within), by reference the geo-fence ID associated with the triggering geo-fence definition determined at step 410. The SD may then reference the alert mapping stored locally at the SD, using the triggering geo-fence ID, to determine what alert is associated with the triggering geo-fence ID. In some embodiments, the alert mapping may not be stored at the SD or may be currently unavailable or corrupted. Accordingly, at step 416, instead of accessing a locally stored mapping, the SD may transmit a request to its serving BS, including the geo-fence ID, requesting it to identify the alert currently associated with the geo-fence ID of the geo-fence it has newly entered. A response from the serving BS may then identify the alert (perhaps via alert ID) currently associated with the geo-fence ID of the geo-fence it has newly entered. In still further embodiments, instead of explicitly requesting the identity of the alert, the SD may tune to a control channel or conventional channel (or other signaling channel) associated with its serving BS and wait for a periodic or intermittent broadcast of currently active geo-fence to alert mappings that can then be used by the SD to identify the alert currently associated with the geo-fence ID of the geo-fence it has newly entered.

At step 418, the SD begins playing back the alert associated with the geo-fence it has newly entered or newly found itself within in accordance with the alert parameters, perhaps identified via an alert ID look-up table same or similar to that set forth in Table III above. In embodiments in which the alert is an alert tone, the SD may determine if it already has an incoming audio or voice call being played back and, if so, may sum the alert tone with the incoming audio or voice call before playing back the summed audio.

In other embodiments in which the SD may find itself within two or more active geo-fences, the SD may use some logic to determine which alerts take priority over others. For example, with reference to FIG. 1, SD 16 may move within geo-fence 64 at location 16B and then into geo-fence 74 at location 16C. When determining which alerts to play back at location 16C, the SD 16 may access a priority indication additionally stored in the geo-fence database with respect to each alert (e.g., in the alert ID look-up table of Table III above, not shown) and/or with respect to each geo-fence definition (e.g., in geo-fence definition look-up table of Table I above, not shown). The SD may then use the priority information to determine which alert and/or which geo-fence should take priority over the other(s). In some embodiments, the higher priority geo-fence and/or alert may be played back at the expense of the lower priority geo-fence(s) and/or alert(s). In embodiments in which the alerts are alert tones, the higher priority geo-fence and/or alert tone may have its playback volume increased relative to the lower priority geo-fence(s) and/or alert tone(s), and the alert tones summed together, before playing back the summed audio. For example, with respect to FIG. 1, geo-fence 64 may be associated with alert ID 0 as an approach warning tone to alert the SD user that they are approaching a dangerous area, and geo-fence 74 may be associated with alert ID 1 as an entrance warning to alert the SD user that they have entered the dangerous area. In this example, the alert ID 1 entrance warning tone and/or geo-fence 74 may be set at a higher priority than alert ID 0 approach warning tone and/or geo-fence 64, and the alert ID 1 entrance warning tone may be played back in place of the alert ID 0 approach warning tone. Once the SD exits geo-fence 74 but remains within geo-fence 64, the alert ID 0 approach warning tone may again be played back until the SD exits geo-fence 64 as well.

Still further, geo-fence and/or alerts having an equal priority could be displayed and/or played back simultaneously or in an alternating fashion. For example, an alert tone and a text display alert associated with separate geo-fence definitions and having equal priority could be executed simultaneously, while two audio alert tones associated with separate geo-fence definitions and having equal priority could be summed together at equal volume or played back in an alternating fashion. Other possibilities exist as well.

At step 420, the geo-fence ID associated with the alert that is begun to be played back at step 418 is marked as active at the SD, perhaps in the geo-fence database or perhaps in RAM, such as RAM 304, of the SD. The active status may be used to aid in making a future determination of whether an alert mapping of an actively played-back geo-fence alert has updated at step 430. After step 420, processing returns to step 404.

Returning to step 414, if instead it is determined that an in->out geo-fence trigger was raised at step 410, processing proceeds from step 414 to step 422, where the SD determines the geo-fence ID of the geo-fence it has newly exited, and references the alert mapping to determine what alert was associated with the geo-fence. At step 424, the SD halts playback of the alert associated with the geo-fence it has newly exited. In some embodiments, the SD may determine if the SD already has an incoming audio or voice call being played back and, if so, may halt summing of the alert with the incoming audio or voice call, and instead, simply play back the incoming audio or voice call (assuming no other alerts are active).

At step 426, the geo-fence ID associated with the alert that was halted at step 424 is marked as inactive at the SD, perhaps in the geo-fence database or perhaps in RAM, such as RAM 304, of the SD. The inactive status may be used to aid in making a future determination of whether an alert mapping of an actively played-back geo-fence alert has been updated at step 430. After step 426, processing returns to step 404.

Figure 6:
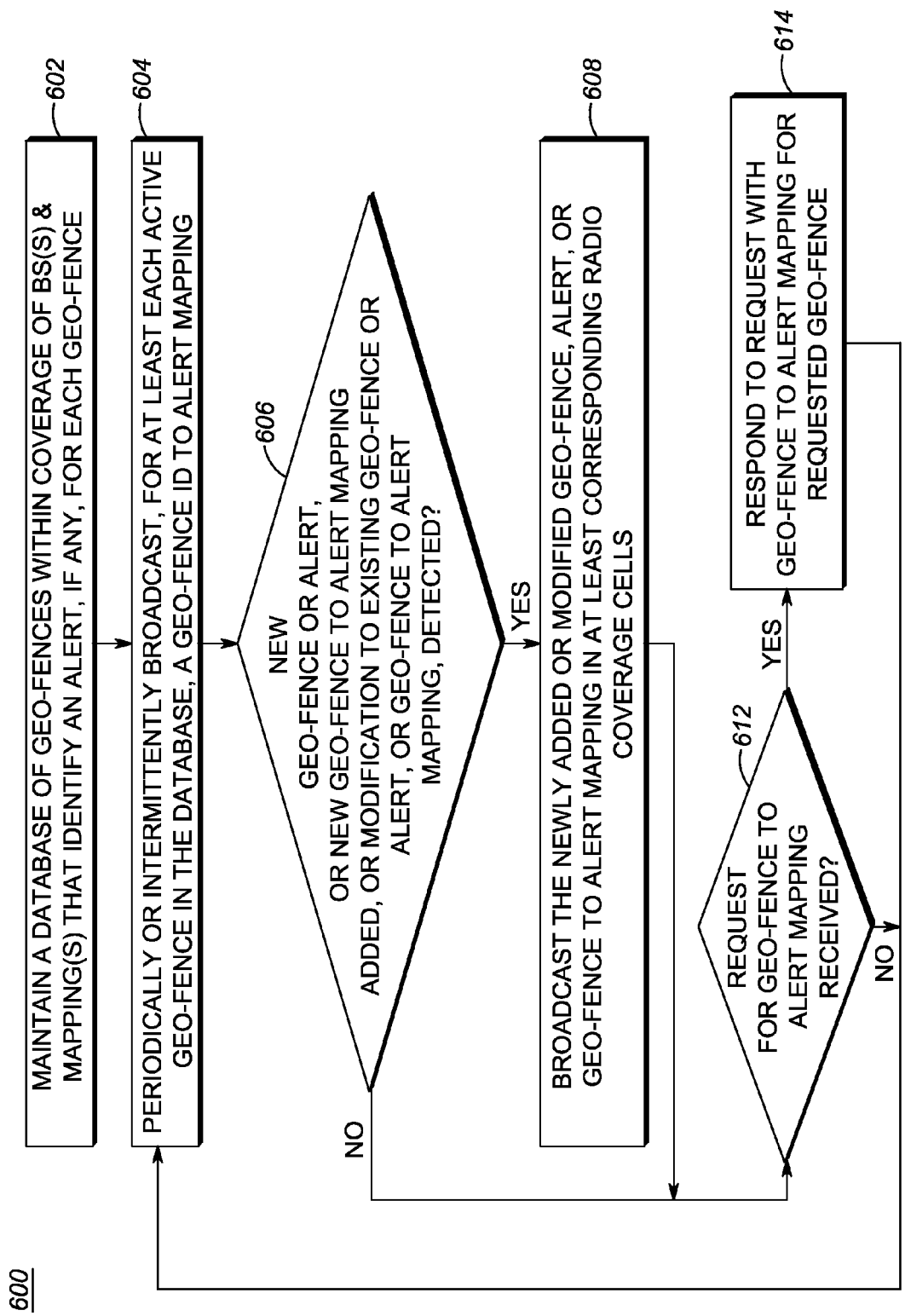
FIG. 6 is a flow diagram illustrating a process that may be implemented at a geo-fence server of FIG. 2 in accordance with an embodiment.

FIG. 6 sets forth a flow chart illustrating a process 600 that may be implemented at a geo-fence server such as the geo-fence server 26 of FIG. 1 and/or the geo-fence server 200 of FIG. 2 to provide geo-fence based alerts consistent with the present disclosure. Of course, additional steps not disclosed herein could be additionally added before, after, or in-between steps disclosed in FIG. 6, and the presence of such additional steps would not negate the purpose and advantages of the examples set forth in detail throughout the remainder of this disclosure.

At step 602, the geo-fence server maintains a database of geo-fence definitions and geo-fence to alert mappings that, for those active geo-fence definitions, designate an assigned alert for playback when client SDs determine that they have entered or otherwise determined that they are within the defined boundaries of a particular geo-fence. The geo-fence definitions stored at the geo-fence server may be pre-configured and static, or may be updated from time to time via a user interface such as input 206 and screen 205 of geo-fence server 200 or via an updated database loaded into the geo-fence server via static memory 216 and/or I/O interface 209.

Geo-fence definitions stored at the geo-fence server, or at external database 28 communicatively coupled to the geo-fence server, may take a form that is the same or similar to that set forth above with respect to the geo-fence definitions stored at the SDs. Alert mappings may be provided separately from the geo-fence definitions or integrated with the geo-fence definitions themselves. Due to the potential size of the geo-fence definitions, in some embodiments, the entire set of geo-fence definitions are initially pre-loaded at each SD such that the geo-fence server does not need to periodically or intermittently broadcast all of the geo-fence definitions over the air. In this way, the geo-fence definitions are separately maintained at both the geo-fence server and at each SD, and the geo-fence server ensures that SDs are updated whenever the geo-fence definitions are changed at the geo-fence server. Updates to geo-fence definitions or newly added geo-fence definitions may be broadcast to SDs depending on system configuration and available bandwidth, as set forth below.

At step 604, the geo-fence server periodically or intermittently causes, for at least each active geo-fence in the database, a geo-fence ID to alert mapping to be broadcast by all BSs it is associated with, or in some embodiments, by only those BSs that have a radio coverage cell that fully or partially covers a geo-fence definition. In a trunked system, for example, the geo-fence server may instruct a control channel repeater at each site to periodically or intermittently broadcast current geo-fence ID to alert mappings, without further stimulus from the geo-fence server. In a conventional or broadband system, the geo-fence server may itself periodically or intermittently cause the current geo-fence ID to alert mappings to be broadcast over conventional channels. Other possibilities exist as well.

A geo-fence may be considered active with respect to the geo-fence server if it has a non-<Null> value associated with the geo-fence in the geo-fence to alert mapping such that SDs entering the geo-fence would need to take some action to generate or playback an alert associated with that geo-fence. A geo-fence mapped to a <Null> alert or otherwise not having an associated alert for playback is considered, at least temporarily, inactive. The periodic or intermittent broadcast of geo-fence ID to alert mappings allows SDs to ensure that they have up to date information in their geo-fence databases with respect to which alerts to play back when entering or finding itself within a particular geo-fence. For example, with respect to FIG. 1, if geo-fence 64 is currently inactive but geo-fence 74 is currently active, the geo-fence server at step 604 of process 600 may cause only the geo-fence ID to alert mapping associated with geo-fence 74 to be broadcast via BS 40, and no mappings associated with either of geo-fence 64 or geo-fence 74 to be broadcast via BS 20. In other embodiments, geo-fence server causes mappings associated with both geo-fence 64 (perhaps including a <Null> or other inactive indication) and geo-fence 74 to be broadcast by both BSs 20 and 40.

The periodic or intermittent broadcast may be transmitted on a control channel at each radio site, on a conventional channel associated with each radio site, or otherwise transmitted on a signaling channel accessible to the SDs operating at the radio sites.

At step 606, the geo-fence server determines whether a new geo-fence definition, a new alert, a new geo-fence to alert mapping, a modified geo-fence definition, a modified alert, and/or a modified geo-fence to alert mapping has been made at the geo-fence server via any one or more of the methods already mentioned above for maintaining the geo-fence database. If such an addition or modification is not detected at step 606, processing proceeds to step 612.

Returning to step 606, assuming an addition or modification is detected at step 606, processing proceeds to step 608, where the newly added or modified information is caused to be broadcast by at least BSs corresponding to the information being changed, if not all BSs associated with the geo-fence server. For example, the addition of a new geo-fence definition defining geo-fence 54 within radio coverage cell 22 of FIG. 1 in the geo-fence database maintained by the geo-fence server may be caused to be broadcast by at least BS 20, and perhaps BS 40 as well. In another embodiment, a detected change to a geo-fence ID to alert mapping associated with geo-fence 54 may result in the geo-fence server causing the updated information to be immediately broadcast (instead of waiting for a next periodic or intermittent broadcast time period set forth in step 604), perhaps via a message structure 500, by BS 20 and/or BS 40 as well. The change to the alert mapping may be especially important in certain situations, such as a mining operation when an alert may change from a "blasting today" alert tone to a "blasting imminent" alert tone just prior to the blasting occurring, or other such similar situations, and thus may be broadcast out of turn from the periodic or intermittent broadcasting of step 604. After the new or modified geo-fence information is broadcast at step 608, processing proceeds to step 612

At step 612, the geo-fence server determines if a request for a geo-fence to alert mapping was received, perhaps from an SD over a control or traffic channel assigned to a particular radio site or SD associated with the geo-fence server. If no such request is received at step 612, processing proceeds back to step 604.

If, however, such a request is received at step 612, processing proceeds to step 614, where the geo-fence server retrieves the geo-fence to alert mapping associated with the geo-fence ID identified in the request, and then causes the mapping to be broadcast by the SD's serving BS.

3. Conclusion

In accordance with the foregoing, an improved method and apparatus for providing alerts, and more particularly, to providing geo-fence based alerts in a wireless communication system. As a result, a more flexible, robust, and adaptable alert system can be provided, improving safety across many geographic regions and functions. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing geo-fence based alerts in a wireless communications network, the method comprising:
    maintaining, at the first wireless subscriber device, a geo-fence database containing (i) geo-fence definitions and (ii) an updateable geo-fence to alert mapping that, for each geo-fence definition, designates an assigned alert for playback and is updateable via an over-the-air message received via a transceiver of the first wireless subscriber device;
    determining, by a first wireless subscriber device, a current location of the first wireless subscriber device;
    detecting, by the first wireless subscriber device, a geo-fence trigger comprising determining, as a function of the determined current location and the geo-fence database, that the first wireless subscriber device has either (i) crossed a geo-fence boundary into a first geo-fence defined in the geo-fence database or (ii) is within the first geo-fence and has not yet begun playing back an alert associated with the first geo-fence; and
    responsive to detecting the geo-fence trigger:
        identifying, by the first wireless subscriber device and as a function of the geo-fence to alert mapping, an alert associated with the first geo-fence; and
        beginning playback, by the first wireless subscriber device, of the alert associated with the first geo-fence.

2. The method of claim 1, wherein the mapping identifies, for each geo-fence defined in the geo-fence database, a particular alert identifier, wherein the alert identifier identifies one or more of a particular stored audio file to playback for the alert, an on-duration and off-duration for playback of the alert, a frequency of the alert, a pitch of the alert, a volume of the alert, a text content of the alert, a particular stored image file to display for the alert, and a priority of the alert.

3. The method of claim 1, further comprising the first wireless subscriber receiving, via a transceiver, an updated geo-fence to alert mapping over-the-air message for a second geo-fence defined in the geo-fence database identifying a new alert to associate with the second geo-fence, and updating the geo-fence database with the updated geo-fence to alert mapping associated with the second geo-fence.

4. The method of claim 3, wherein prior to updating the second geo-fence, the second geo-fence was flagged inactive or had a <NULL>value for its associated geo-fence to alert mapping, and after updating the geo-fence database, one of flagging the second geo-fence as active and over-writing the <NULL>value with the new alert indicated in the updated geo-fence to alert mapping.

5. The method of claim 3, wherein the second geo-fence is the same as the first geo-fence.

6. The method of claim 5, the method further comprising modifying the playback, by the first wireless subscriber device, of the alert associated with the first geo-fence to begin playing back the new alert in place of a prior alert.

7. The method of claim 1, wherein the alert associated with the first geo-fence is an alert tone associated with the first geo-fence, and beginning playback of the alert tone associated with the first geo-fence comprises:
    determining that a prior alert tone associated with a second geo-fence different from the first geo-fence was already being played back;
    determining that the alert tone associated with the first geo-fence has a higher relative priority than the prior alert tone, and responsively halting play-back of the prior alert tone in favor of playback of the alert tone associated with the first geo-fence.

8. The method of claim 7, wherein the first geo-fence is a geographic sub-region of the second geo-fence.

9. The method of claim 1, wherein the alert associated with the first geo-fence is an alert tone associated with the first geo-fence, and beginning playback of the alert tone associated with the first geo-fence comprises:
    determining that one of (i) a prior alert tone associated with a second geo-fence different from the first geo-fence is already being played back and (ii) the first subscriber device is currently participating in a call, and responsively:
        summing the alert tone associated with the first geo-fence with the one of the prior alert tone and audio from the call, and playing back the summed audio.

10. The method of claim 1, further comprising:
    determining, by the first wireless subscriber device, an updated current location of the first wireless subscriber device;
    detecting, by the first wireless subscriber device, a second geo-fence trigger comprising determining, as a function of the determined updated current location and the stored geo-fence database, that the first wireless subscriber device crossed a geo-fence boundary out of the first geo-fence defined in the geo-fence database; and
    responsive to detecting the second geo-fence trigger:
        identifying, by the first wireless subscriber device, the alert associated with the first geo-fence; and
        stopping playback, by the first wireless subscriber device, of the alert associated with the first geo-fence.

11. The method of claim 1, further comprising the first wireless subscriber device receiving, via a transceiver, both (i) a new geo-fence definition for a geo-fence in a radio coverage cell in which it is currently operating, and (ii) a new geo-fence to alert mapping identifying a new alert to associate with the new geo-fence definition, and responsively:

storing the new geo-fence definition and corresponding new geo-fence to alert mapping in the geo-fence database; and determining, based on the determined current location, whether the first wireless subscriber device is located within the new geo-fence, and if so, beginning playback of the new alert identified in the new geo-fence to alert mapping.

12. The method of claim 1, wherein the alert associated with the first geo-fence is one of an alert associated with a blasting operation affecting an area defined by the first geo-fence, an alert associated with a weather condition affecting an area defined by the first geo-fence, a commercial or industrial hazard affecting an area defined by the first geo-fence, and an incident scene occurring within an area defined by the first geo-fence.

13. The method of claim 1, wherein maintaining, by the first wireless subscriber device, the geo-fence database comprises:

the first wireless subscriber device transmitting a request to its serving base station requesting the alert currently associated with the first geo-fence, and in response, receiving an indication from the serving base station identifying the alert associated with the first geo-fence and storing the identified alert to first geo-fence mapping in the geo-fence database.

14. The method of claim 1, wherein identifying, by the first wireless subscriber device, the alert associated with the first geo-fence comprises:

the first wireless subscriber device tuning to one of a control channel and a conventional channel of its serving base station and waiting for a broadcast of an indication from the serving base station identifying the alert currently associated with the first geo-fence; and the first wireless subscriber device receiving, on the one of the control channel and the conventional channel of its serving base station, the indication from the serving base station identifying the alert currently associated with the first geo-fence and storing the identified alert to first geo-fence mapping in the geo-fence database.

15. A subscriber device operating in a wireless communications network and capable of entering a power-saving mode, the subscriber device comprising:

a memory;
one of a display and a speaker;
a transceiver; and
a processor configured to:
maintain, in the memory, a geo-fence database containing (i) geo-fence definitions and (ii) an updateable geo-fence to alert mapping that, for each geo-fence definition, designates an assigned alert for playback and is updateable via an over-the-air message received via the transceiver;

determine a current location of the first wireless subscriber device;

detect a geo-fence trigger comprising determining, as a function of the determined current location and the geo-fence database, that the first wireless subscriber device has either (i) crossed a geo-fence boundary into a first geo-fence defined in the geo-fence database or (ii) is within the first geo-fence and has not yet begun playing back an alert associated with the first geo-fence; and responsive to detecting the geo-fence trigger:
identify, as a function of the geo-fence to alert mapping, an alert associated with the first geo-fence; and
begin playback, via the one of the display and the speaker, of the alert associated with the first geo-fence.

16. A geo-fence method at a geo-fence server for providing geo-fence based alerts in a wireless communications network, the method comprising:

maintaining, by a geo-fence server, a database of geo-fences within a radio coverage cell of each of one or more base stations associated with each radio coverage cell, the database including a geo-fence to alert mapping that identifies, for each geo-fence in the database, a corresponding alert for playback by a wireless subscriber device when the wireless subscriber device enters the geo-fence;

periodically or intermittently causing to be broadcasted, by the geo-fence server and for at least each geo-fence in the database, the geo-fence to alert mapping identifying a corresponding alert for play back by a wireless subscriber device when the wireless subscriber device enters the geo-fence; and responsive to one of (i) detecting an addition to the geo-fence database of a new geo-fence and new geo-fence to alert mapping that maps the new geo-fence to a particular alert, and (ii) a modification to an existing geo-fence to alert mapping associated with an existing geo-fence: causing the one of the new geo-fence to alert mapping and the modified existing geo-fence to alert mapping to be broadcast in one or more radio coverage cells in which the new geo-fence or existing geo-fence is located.

17. The method of claim 16, further comprising refraining from broadcasting geo-fence definitions defining each of the geo-fences in the database, unless a modification to a geo-fence definition is detected, in which case only the updated geo-fence definition is broadcast.

\* \* \* \* \*